June 29, 1948.  O. C. NORTON  2,444,108
INTERNAL-COMBUSTION ENGINE
Filed May 1, 1944  3 Sheets-Sheet 1

INVENTOR.
Orlo Clair Norton
BY Parker, Prochnow & Farmer,
ATTORNEY.

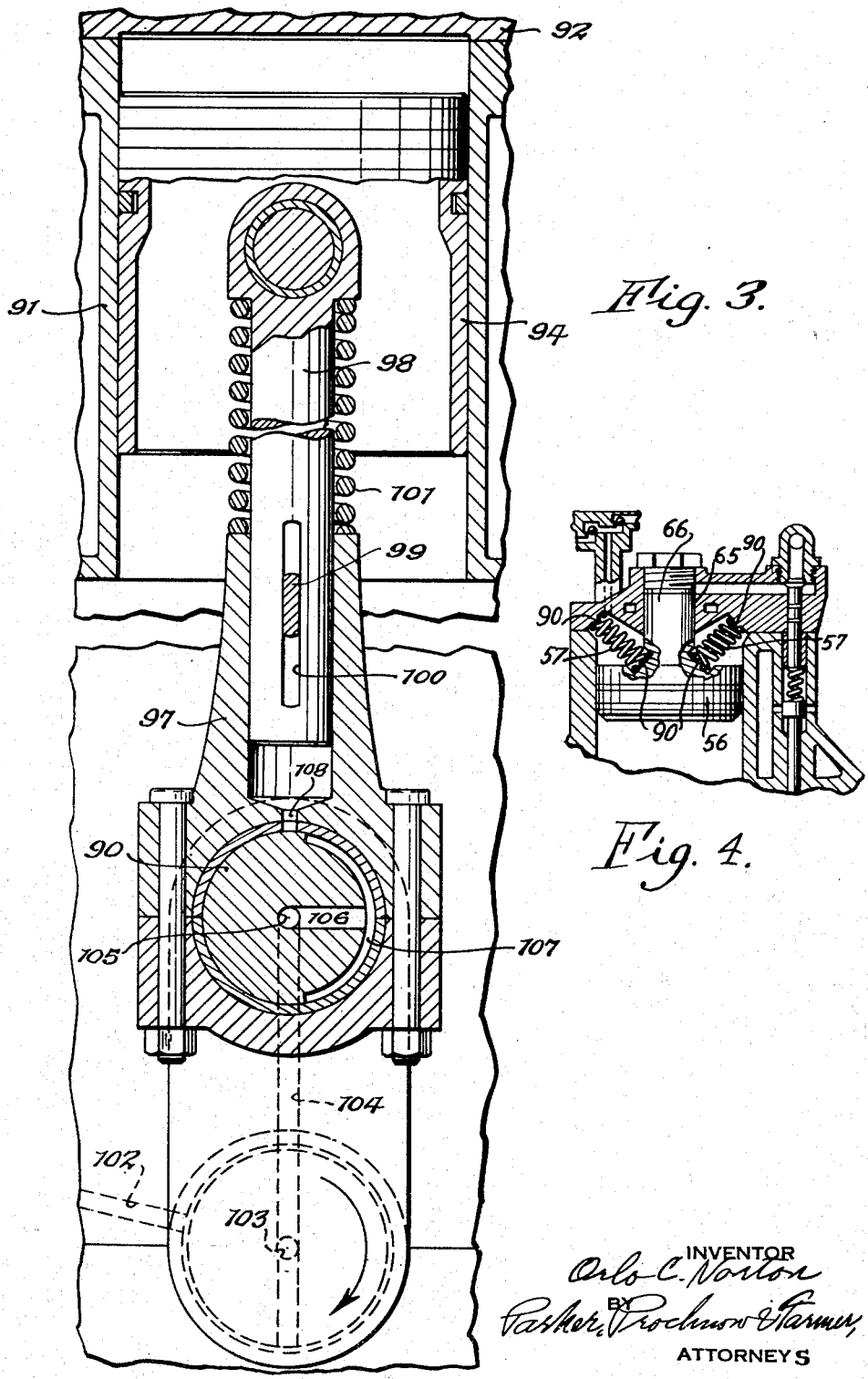

Patented June 29, 1948

2,444,108

UNITED STATES PATENT OFFICE 2,444,108

INTERNAL-COMBUSTION ENGINE

Orlo C. Norton, Erie, Pa., assignor of twenty-five per cent to Norman I. Book, Kenmore, N. Y.

Application May 1, 1944, Serial No. 533,509

6 Claims. (Cl. 123—78)

This invention relates to improvements in internal combustion engines.

One of the objects of this invention is to provide an engine of improved construction, which will be more reliable and efficient in operation during all load conditions than present-day engines.

Another object of this invention is to provide an internal combustion engine in which the compression pressure in the engine will be substantially uniform at all engine loads and speeds. A further object is to provide an engine in which the compression temperature will be substantially the same at all loads and speeds of the engine to produce more uniform operation of the engine.

A further object of this invention is to provide an engine which is so constructed as to produce a more uniform and reliable lubrication of the pistons and cylinders. It is also an object of this invention to provide an engine having a variable clearance space or volume between the cylinder head and the piston, which clearance varies in accordance with the load. A further object is to provide an engine in which more thorough scavenging of the cylinders will result during the exhaust, with consequent improved operation of the engine.

A further object is to provide an engine with a clearance chamber of varying volume by means of which a substantially constant pressure may be attained during the compression stroke of the engine regardless of the volume of air or explosive mixture admitted to the cylinder. A further object is to provide a clearance chamber of this type having a piston therein, which is yieldingly urged to the end of the cylinder for expelling gases from the clearance chamber during exhaust. A further object is to provide a piston in a clearance chamber which may yield during the compression stroke of the engine to admit excess compressed air or fuel mixture when the engine is operating at a load above its minimum. A further object of this invention is to provide means whereby the clearance volume of the engine is held against further increase during the combustion of the fuel.

Another object of this invention is to provide an engine in which the connecting rod of the engine is made in two parts slidable lengthwise of each other to vary the clearance of the piston in accordance with variations in load.

Other objects and advantages of this invention will appear from the following description and claims.

In the accompanying drawings:

Fig. 3 is a fragmentary central sectional elevation of an engine of modified construction having a two-piece connecting rod.

Fig. 4 is a fragmentary vertical sectional view of the upper end of the internal combustion engine with the angularly disposed springs and piston in an upper position.

Figure 1:
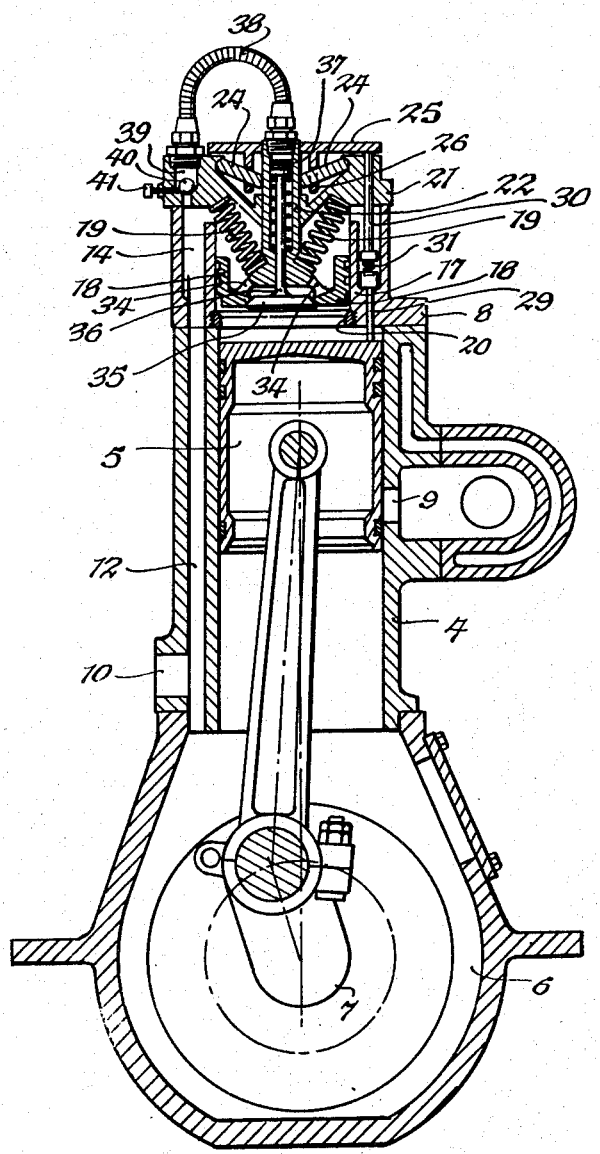
Fig. 1 is a central sectional elevation of a two-cycle engine having the improvements embodying this invention incorporated therein.

My improvements may be used either with two-cycle or four-cycle engines, and in Fig. 1, I have shown a two-cycle engine including a cylinder 4 in which a piston 5 reciprocates. As is customary in two-cycle engines, an air-tight crank case 6 is provided in which the crank shaft 7 operates. The other end of the cylinder 4 has a cylinder head 8 secured thereto. The wall of the cylinder is provided with an exhaust port 9 leading to a suitable exhaust system, and the air and fuel for the engine are taken in through an inlet passage 10 which leads to a duct 12 which, in the construction illustrated, is formed in the cylinder block and leads from the crank case to the cylinder head 8, connecting with a passage 14 in the cylinder head. A spark plug or other ignition means of any suitable type (not shown) may be provided for igniting the charge in the cylinder after the fuel mixture has been compressed by upward movement of the piston 5.

In accordance with my invention, the engine is provided with a much smaller clearance between the end of the piston 5 and the cylinder head 8 than is usually provided in internal combustion engines, preferably the smallest clearance that can be safely used without having the piston strike the cylinder head, and the engine is provided with suitable means for varying the volume of the clearance space in accordance with the volume of air or fuel mixture admitted into the cylinder. These means may be of any suitable or desired form, and in the construction shown in Figs. 1 and 2, the engine is provided with a separate clearance chamber communicating with the cylinder beyond the head end of the piston, into which a variable volume of air and fuel may enter, depending upon the volume of air and fuel drawn into the cylinder. In the particular construction illustrated in Fig. 1, this chamber is in the form of another cylinder 17 formed in the cylinder head 8, and a piston 18 is provided in this clearance chamber or cylinder, this piston being yieldingly urged in any suitable manner into a position to reduce the clearance to a minimum. In the particular construction illustrated, this resilient means is in the form of a plurality of coil spring 19 arranged in the cylinder 17 and yieldingly urging the piston 18 into its lower position. 20 represents a ring forming a stop to limit the downward movement of the clearance piston 18 in its cylinder. The springs are preferably arranged at inclinations to the axis of the piston 18 and bear at their upper ends on pivot point 90 on a cap member 21 and at their other ends on a suitable seat formed on the piston 18. The springs 19 are adapted to move angularly upon movement of the piston 18. Upon upward movement of the piston 18, the springs 19 move to a position more nearly normal to the movement of the piston 18. There is some compression of the springs 19 as they move towards a normal position but the change in angularity of the springs 19 tends to equalize the force exerted by the compression of the springs 19 thereby tending to make the force exerted on the piston 18 by the springs 19 much more constant than where a spring is provided in direct compression. Where compression of a spring is direct, as in prior devices, the spring pressure greatly increases as the spring is compressed making delicate control impossible. Where the springs 19 are short it will be evident that they will come to a nearly normal position in a very short travel of the piston after which time the axial force of the springs 19 reaches the point of substantially zero axial force. The longer the springs 19, the greater will be the limits in which force will be exerted axially by them.

It will be obvious from the foregoing description that when the engine is idling or running at a light load, a small volume of air or explosive mixture is admitted to the cylinder, for example, by moving the throttle valve to a nearly closed position. Consequently, during the compression stroke of the piston 5, this volume is compressed into a volume either insufficient to cause the clearance piston to move from its lowest position or else to cause only slight upward movement of the clearance piston. As shown in Fig. 1, the clearance piston occupies an intermediate position, which it would occupy when the engine is operating at a load intermediate between idling and full load, and with full load, the volume of air or combustible mixture admitted may be large enough to move the clearance piston to a considerably higher position than shown in Fig. 1. Since the pressure of the springs 19 acting on the clearance piston is substantially constant, it follows that the compression pressure and temperature of the engine will be substantially uniform at all loads, which in turn results in greatly increased efficiency of the engine, particularly when operating at less than full load.

In connection with the variable or expansible clearance chamber which has been described, I provide means for preventing further expansion of the clearance space during combustion of the fuel in the cylinder. This may be accomplished in any suitable or desired manner, and in the construction shown in Fig. 1 by way of example, I provide means for locking the piston against farther movement by means of mechanical locking means. For this purpose, the clearance piston 18 is provided with a piston rod 22 which may be gripped before ignition takes place to hold the clearance piston against movement. The gripping or locking means may include a plurality of links 24 which are normally arranged in downwardly inclined positions having their upper and outer ends pivoted on the cap 21, this being accomplished in the particular construction shown by making the outer ends of the links of rounded form to fit into rounded recesses on the cap 21, and the inner ends of the links are formed for gripping engagement with the piston rod 22. Any suitable means may be provided for moving these links into locking engagement with the piston rod to prevent further upward movement of this rod. For example, in the construction shown, I have provided a plate 25 resting on top of the cap 21 and having downwardly extending arms or projections 26 which have apertures through which the links loosely extend, and means are provided for raising the plate 25 when the engine piston 5 reaches its upper position or just prior to the ignition of the charge in the engine cylinder. This may be accomplished in any suitable manner, either by a cam on the cam shaft of the engine (not shown) or by means of one or more rods actuated by the engine piston as the same approaches the upper end of its movement. Each rod, only one of which is shown in Fig. 1, may have a lower part 29 slidably arranged in a hole in the cylinder head 16 and extending into the engine cylinder to an extent sufficient to be engaged by the head end of the piston 5. This lower rod part is yieldingly connected to another rod part 30, for example, by means of a compression spring 31, this rod part 30 extending through the cap 21 into a position to engage the underface of the plate 25 and thus raise the plate, which causes the arms 26 of the plate to move the inner ends of the links 24 into locking engagement with the piston rod 22 of the clearance piston. When in their locking positions, these links prevent farther upward movement of the clearance piston, so that when the combustion of the fuel takes place, the clearance piston will be held against upward movement by the pressure of burning gases. The full pressure of the burning fuel will, consequently, be exerted against the engine piston 5. These links 24, of course, stop only the upward movement of the clearance piston and as soon as the pressure in the engine cylinder during the down stroke is reduced to such an extent that it can be overcome by the pressure of the springs 19, the clearance piston 18 will be moved downwardly, so that the energy stored up in the springs is returned to the engine piston 5 through the medium of the gas in the engine cylinder. The downward movement of the clearance piston also expels the burnt gases within the clearance cylinder. Any other means for locking the clearance piston so that it is free to move upwardly during the compression of the charge in the engine cylinder and is held against farther movement during the combustion of the fuel may be employed, if desired.

The admission of air or combustible mixture to the engine cylinder 4 may be controlled in any suitable or desired manner. In the construction shown by way of example in Fig. 1, the admission of such mixture from the crank case is controlled by means of an inlet valve 35, which in the construction illustrated, is arranged in the clearance piston 18. This piston is provided with passages 34 through which combustible mixture or air may pass to the valve from the passage 14. This valve has a stem 36 which extends into the hollow piston rod 22. The valve is yieldingly held in closed position by means of a compression coil spring arranged about the valve stem and within the hollow piston rod, and the valve is opened during the down stroke of the engine piston 5 due to the pressure of the incoming charge acting on the upper surface of the valve 35.

It is desirable to provide means for retarding the closing of the inlet valve 35 for the purpose of more completely scavenging the burnt gases from the cylinder, and for this purpose the following construction may be used. The upper end of the valve stem 36 has a small piston 37 secured thereon which may reciprocate within the hollow rod 22, the bore of which serves as a cylinder in which this piston 37 may reciprocate the upper end of the hollow piston rod 22 is connected by means of a flexible conduit 38 or other suitable connection with the inlet passage 14 for mixture or air from the crank case of the engine. This flexible tube 38 connects with a passage 39 in the cap 21 of the engine and a combined bleeder and check valve 40 is provided for controlling the entrance of compressed mixture from the passage 14 into the passage 39. In the particular construction shown for this purpose, a ball check valve 40 is provided between the passages 39 and 14 and a screw 41 extends into the passage 39 adjacent to the seat of the valve, sufficiently to engage the ball 40 to hold the same from its seat to the desired extent. The ball will freely rise from its seating position to admit fuel or air from the passage 14 into the passage 39 and when this flow ceases, the ball 40 will be held from its seat to a slight extent to permit bleeding of gases from the passage 39 into the main passage 14. Consequently, when the engine piston 5 moves downwardly and uncovers the exhaust port 9, burnt gases will be discharged and the valve 35 opened by pressure of the combustible mixture in the crank case and after the piston reaches the lower limits of its stroke, and starts to move upwardly, the valve 35 will still be retained in its open position by the pressure of the gas acting on the small piston 37 of the valve stem 36, so that the expulsion of burnt gases through the exhaust port 9 will be continued until the piston on its upward stroke covers the valve port 9. The time interval during which the valve 35 remains open depends upon the position of the screw 41, since this controls the rate at which compressed gas in the duct 38 and passage 39 is permitted to flow back into the main inlet passage 14.

The valve 35 will then remain open after the closing of the exhaust port 9 for a period of time depending upon the extent to which the combustible mixture is discharged from the passage 39 past the bleeder check valve 40. If the valve 40 is nearly closed, bleeding will take place slowly, the valve 35 will be kept open longer, and a considerable amount of the combustible mixture will be discharged back past the valve 35 into the passages 14 and 12. Consequently, when the engine is running at light loads, a considerable quantity of the explosive mixture which has been supplied to the cylinder 4 will be returned past the valve 35 until the pressure in the passage 39 and acting on top of the cap 37 of the valve becomes reduced to such an extent that the valve may close, whereupon the charge remaining in the engine cylinder is compressed. When, on the other hand, the engine is operating at high speed or at a larger load, the bleeder check valve 40 should be opened to a greater extent by means of the screw 41, to permit the valve 35 to close sooner so that a larger quantity of explosive mixture is retained in the engine cylinder for combustion. In this manner, the speed of the engine and the power delivered may be controlled entirely by means of the bleeder valve adjusting screw 41.

The inlet valve controlled by a bleeder passage may, of course, be arranged separately from the clearance piston, as shown in my Patent No. 2,334,688 of November 16, 1943, or the admission of fuel may be effected in any other suitable or desired manner.

Figure 2:
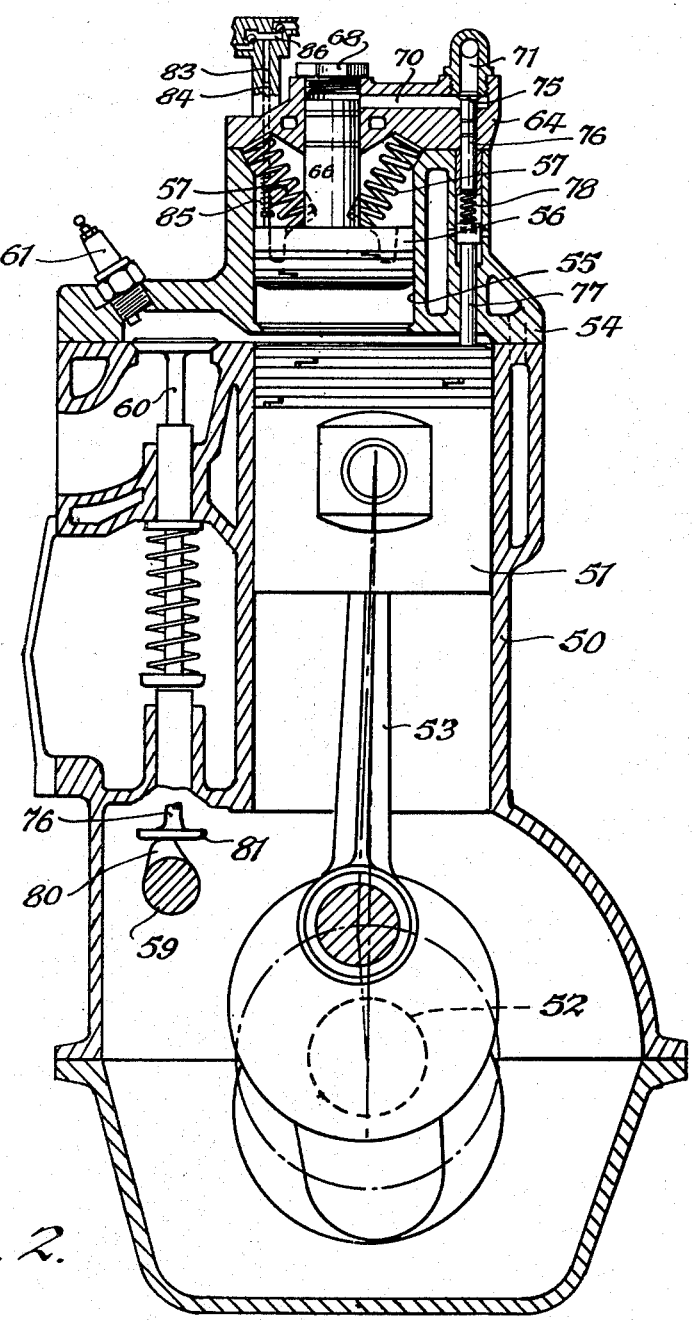
Fig. 2 is a central sectional elevation of a four-cycle engine having my improvements applied thereto.

In the embodiment of my invention shown in Fig. 2, a four-cycle engine is illustrated having a cylinder 50 in which a piston 51 is mounted to reciprocate, the piston actuating a crank shaft 52 through the medium of a connecting rod 53. 54 represents the cylinder head of the engine having a clearance cylinder 55 in which a clearance piston 56 is mounted to reciprocate, springs 57 urging the clearance piston downwardly into its lowest position. In this construction, the usual exhaust and inlet valves are provided which may be controlled by means of a cam shaft 59 in the usual manner, only the inlet valve 60 being shown in the construction illustrated. 61 represents the spark plug for igniting the charge.

In this construction, the cylinder head 54 is provided with a second cylinder head or cap 64 which closes the upper end of the clearance cylinder 55. The second cylinder head or cap is provided with a smaller cylinder 65 in which the piston rod 66 of the clearance piston may reciprocate. The upper end of the small cylinder 65 may be closed by a plug 68. The small cylinder 65 communicates with a liquid passage 70 which may receive oil or other liquid through a valve controlled passage 71 communicating with a supply of oil under pressure, which may, for example, be the oil circulating or lubricating system of the engine.

The passage 71 is controlled by means of a valve 75 having a stem 76 extending out of the second cylinder head 64 and into the main cylinder head 54. This valve stem cooperates with a rod 77 extending into the cylinder of the engine into position to be engaged by the head of the piston 51, and a spring 78 is interposed between the two rods. Consequently, when the engine piston approaches its uppermost position, it moves the rod 77 upwardly and through the medium of the spring 78 and valve stem 76, seats the valve 75 against the oil pressure in 71. Consequently, when the explosive charge in the engine cylinder is ignited, an entrapped body of oil between the piston rod 66 and the valve 75 prevents farther upward movement of the clearance piston 56. During the expansion stroke, the spring 57 will urge the clearance piston 56 and its rod 66 downwardly, thus drawing oil into cylinder 65, and thus opening the valve 75.

While I have shown my improved variable clearance device applied to two specific types of internal combustion engines, it will be obvious that my improvements may be applied to any type of reciprocating internal combustion engine. In case of compression ignition or Diesel type of engine, only sufficient air is admitted in the four-cycle type, or retained in the two-cycle type to burn the amount of oil which is injected after compression, but due to the variable clearance, the same compression temperature and pressure are obtained regardless of load, speed, cylinder temperature and minor leaks. Since the movement of the clearance piston at all times corresponds to the amount of air compressed in the corresponding engine cylinder, it will be evident that the movement of the clearance piston may be utilized to meter the fuel in a fixed ratio to the volume of air in the cylinder, which is very desirable in order to produce uniform operation and high efficiency of the engine at all loads.

The movement of the clearance pistons 18 and 56 is, of course, substantially proportional to the load of the engine and, consequently, the movement of these pistons can advantageously be utilized to actuate a fuel pump. Such a pump may be mounted on the engine in any suitable manner, and in the construction shown by way of example in Fig. 2, I show a pump barrel 83 secured on the cylinder cap 64 and having a plunger 84 reciprocable therein, which is acted upon by a spring 85 to keep the lower end of the plunger in contact with the piston 56. The barrel terminates at its upper end in a chamber 86 having valve controlled inlet and outlet passages which may be connected with suitable ducts (not shown) leading to the fuel tank and to an injection valve or other device.

In Fig. 3, I have shown a construction by means of which variable clearance and substantially constant pressures may be attained by yieldingly mounting the piston with reference to the crank shaft. In the particular construction illustrated by way of example, the connection is made so that it can be shortened under pressure, thus providing clearance in accordance with the amount of gas in the cylinder.

90 represents a crank of the crank shaft of the engine, 91 the engine cylinder, 92 the cylinder head which may be provided with a suitable port or ports (not shown) for the admission and discharge of gases, and 94 represents the piston which may be of any usual or suitable construction.

The piston is connected with the crank 90 of the engine crank shaft by means of a piston rod which is made in two parts slidable relatively to each other, namely, a lower part 97 and an upper part 98. The upper part 98 has its upper end journalled on the piston in the usual manner and the lower part 87 has the usual bearing on the crank shaft and the major portion thereof is of substantially cylindrical form having an inner bore which forms a cylinder in which the other part 98 of the connecting rod may reciprocate. The movement of the two piston rod parts relatively to each other is limited in any suitable manner, for example, by a key 99 which may be secured at its ends to the part 97 and project through a slot 100 in the upper piston rod part 98. The two piston rod parts are urged by a spring 101 into their extended positions in which the piston will have the minimum clearance with the cylinder head, and this position will be controlled by the key 99, which will be in the lower end of the slot 100 when the spring has urged the piston rod into its longest or most extended position.

From the foregoing description, it will be obvious that the extent of movement of the piston 95 into the cylinder during the compression stroke will vary in accordance with the amount of gas admitted to the cylinder, and the spring 101 will also be compressed in accordance with the amount of gas in the cylinder, so that the clearance space will vary in accordance with the load of the engine.

I also provide means for preventing further compression of the spring 101 and enlargement of the clearance when explosion of the charge in the cylinder takes place. For this purpose, I provide suitable oil passages in the crank shaft, such as have heretofore been used for lubrication, and which are connected with an oil pump or other source of oil supply through a passage 102. A passage 103 in the central portion of the crank shaft connects with passages 104 and 105 in the crank portion thereof, and a radial hole 106 is provided in the crank portion 90 which extends from the oil passage 105 to the peripheral portion of the crank 90. This crank portion of the crank shaft is provided with a peripheral groove 107, the length of which is such that during the compression of the charge in the engine cylinder, this groove 107 will be in communication with a hole or passage 108 leading to the cylindrical bore in the lower part 97 of the crank shaft. Consequently, during the compression stroke of the engine, oil may flow into or out of the cylindrical bore of the piston rod part 97. Just before ignition takes place, the end of the groove 107 passes out of registration with the hole or passage 108, so that oil in the cylinder in the lower piston rod part 97 will be confined during the ignition, thus forming an oil lock which holds the piston part 98 in substantially fixed relation to the part 97 during combustion and period of high pressure in the cylinder. This rod will elongate due to pressure of the spring 101, even though the passage 108 is closed during expansion, forming a vacuum in the cylindrical bore which is again filled when the passage 108 registers with the groove 107. This groove 107 is of such length that just before the exhaust valve is opened, communication will again be established between the groove 107 and the passage 108, so that oil may enter into the cylindrical bore of the part 97, thus permitting the spring 101 to move the upper piston rod part 98 upwardly, so that the piston will move to the end of its stroke for providing the maximum discharge of burnt gases from the cylinder.

One of the shortcomings of spark ignition engines as now commonly constructed, in which the fuel is drawn in with the air, is that the compression pressure of the explosive mixture varies with different loads of the engine. Engines of this type when operating at near full load compress the fuel mixture to pressures of approximately from 90 to 120 pounds, but since these engines are seldom operated at full load, the average running load results in pressures in the cylinder which may be as low as about 20 pounds at quarter load. This results in low thermal efficiency and a low expansion ratio, so that much power is lost.

It will be noted that in engines equipped with my improvements, these shortcomings are overcome by so constructing the engine that the clearance between the upper end of the piston and the cylinder head is reduced to a minimum, so that when the engine is running at low loads, the compression of the fuel mixture may be approximately that of a present-day engine when operating at full load. Consequently, if a larger amount of combustible mixture or air is supplied to the engine, the same compression may be attained, but the clearance of the engine will be increased either by the upward movement of the clearance pistons 18 or 56 or by the contraction of the connecting rod shown in Fig. 3. By the proper selection of the springs or other yielding means for opposing the upward movement of the pistons in Figs. 1 and 2 or by the spring which holds the two parts of the connecting rod in Fig. 3 in their extended positions, any desired compression pressure in the engine may be attained.

Another advantage of the constructions herein described over engines as heretofore constructed is that in the prior art engines a clearance had to be provided which would be ample to take care of the full load operating conditions of the engine. Consequently, during exhaust, burnt gases remain in the clearance space, which is, of course, objectionable in that they dilute the incoming charge and decrease the efficiency and power of the engine. By means of my improved construction, the clearance during exhaust is the minimum, which may be just enough to prevent the piston from striking the cylinder head. Consequently, by materially reducing the clearance space during exhaust, a much greater percentage of the burnt gases will be discharged than was heretofore possible. When operating under loads sufficient to cause the clearance space to be temporarily increased during compression, this clearance is again decreased to the minimum during exhaust, thus producing an almost complete discharge of burnt gases into the exhaust.

Consequently, in my improved engine, the clearance volume is very low during the scavenging, and this volume is varied during the compression stroke so as to reach approximately the highest temperature and pressure in the explosion and the greatest expansion and lowest terminal pressure, so that my improved engine will obtain better thermal efficiency at all loads and greater power at full load. By maintaining more uniform pressure and temperature in the cylinders, the oil supply to the cylinders will be more uniform than in engines where the compression pressures and temperatures vary widely.

I claim as my invention:

1. An internal combustion engine including a cylinder having a head, a piston reciprocable in said cylinder, a variable clearance chamber directly connected with said cylinder at said head, a movable member in said clearance chamber, and pivoted angularly movable spring means yieldingly urging said movable member into position to reduce the volume of said clearance chamber communicating with said cylinder to a minimum and to maintain constant compression pressures therein at all loads.

2. An internal combustion engine including a cylinder having a head, a piston reciprocable in said cylinder, a clearance cylinder in direct communication with said engine cylinder, a clearance piston in said clearance cylinder, and pivoted angularly movable spring means for urging said clearance piston into position to reduce the clearance of said engine cylinder to a minimum, and permitting said clearance piston to yield to maintain constant compression pressures for all gas charges entering said engine cylinder.

3. An internal combustion engine including a cylinder having a head, a piston reciprocable in said cylinder, a variable clearance chamber directly communicating with said cylinder at said head, movable means for normally reducing the volume of said clearance chamber at each cycle of said engine to a minimum, and pivoted angularly movable spring means urging said movable means into volume reducing position and permitting enlargement of said chamber volume at each cycle of said engine to admit charges of varying volume and exerting substantially constant pressure on each charge during the compression strokes of said piston, and to expel burnt gases therefrom during the exhaust stroke.

4. In an internal combustion engine having a cylinder and a piston reciprocable therein, the combination of a cylinder head having a clearance cylinder therein communicating with said engine cylinder, a clearance piston in said clearance cylinder yieldingly urged by pivoted angularly movable spring means toward said engine cylinder to reduce the clearance in said engine cylinder to a minimum, a piston rod for said clearance piston, and links movable into gripping engagement with said piston rod just prior to combustion of fuel in the engine cylinder to hold said clearance piston against further movement in a direction to increase the clearance.

5. In a two-cycle internal combustion engine having a cylinder and a piston reciprocable therein, the combination of a cylinder head having a clearance chamber of cylindrical form communicating with said engine cylinder, a clearance piston in said clearance chamber, pivoted angularly disposed spring means for yieldingly urging said clearance piston into position to reduce clearance of the engine to a minimum and to permit said clearance piston to move into its cylinder due to compression pressure of the engine, said clearance piston having a piston rod, means cooperating with said piston rod for locking said clearance piston against farther movement into its cylinder during explosion and during a part of the power stroke of the engine cylinder, said clearance piston having a valve seat, and an inlet valve on said clearance piston cooperating with said valve seat.

6. In a two-cycle internal combustion engine having a cylinder and a piston reciprocable therein, the combination of a cylinder head having a clearance chamber of cylindrical form communicating with said engine cylinder, a clearance piston in said clearance chamber, pivoted angularly disposed spring means for yieldingly urging said clearance piston into position to reduce clearance of the engine to a minimum and to permit said clearance piston to move into its cylinder due to compression pressure of the engine, said clearance piston having a hollow piston rod and said cylinder head having a bore for guiding said rod, means cooperating with said piston rod for locking said clearance piston against movement into its cylinder during explosion of a combustible mixture in the engine cylinder, said clearance piston having a valve seat, and a fuel inlet valve mounted on said clearance piston, said valve having a stem extending into said hollow piston rod for guiding said valve toward and from said seat.

ORLO C. NORTON.

REFERENCES CITED

The following references are of record in the file of this patent:

UNITED STATES PATENTS

| Number | Name | Date |
|---|---|---|
| 906,177 | Westinghouse | Dec. 8, 1908 |
| 922,613 | McClintock | May 25, 1909 |
| 1,313,414 | Ottewell | Aug. 19, 1919 |
| 1,409,776 | Randall | Mar. 14, 1922 |
| 1,439,626 | Hotto | Dec. 19, 1922 |
| 1,612,163 | Todd | Dec. 28, 1926 |
| 1,637,245 | Scully | July 26, 1927 |
| 2,134,995 | Anderson | Nov. 1, 1938 |

FOREIGN PATENTS

| Number | Country | Date |
|---|---|---|
| 13,895 | Austria | Oct. 26, 1903 |
| 176,233 | Great Britain | Mar. 9, 1922 |